(12) United States Patent
Hamrin et al.

(10) Patent No.: US 7,810,601 B2
(45) Date of Patent: Oct. 12, 2010

(54) ALL TERRAIN OR UTILITY VEHICLE HAVING SELECTABLE DRIVE CONFIGURATIONS AND METHOD THEREFORE

(75) Inventors: John Edward Hamrin, Bemidji, MN (US); Matthew Douglas Cann, Bemidji, MN (US); Shane Clair Okeson, Detroit Lakes, MN (US); David Michael Gordon, Bagley, MN (US)

(73) Assignee: TEAM Industries, Inc., Audobon, MN (US)

( * ) Notice: Subject to any disclaimer, the term of this patent is extended or adjusted under 35 U.S.C. 154(b) by 1245 days.

(21) Appl. No.: 11/251,097

(22) Filed: Oct. 14, 2005

(65) Prior Publication Data

US 2007/0084659 A1 Apr. 19, 2007

(51) Int. Cl.
*B60K 17/34* (2006.01)
*B60K 17/344* (2006.01)

(52) U.S. Cl. .................. 180/233; 180/248; 701/69

(58) Field of Classification Search .......... 180/197, 180/233, 248, 249; 701/69
See application file for complete search history.

(56) References Cited

U.S. PATENT DOCUMENTS

| | | | |
|---|---|---|---|
| 4,488,454 A | 12/1984 | Goscenski, Jr. | |
| 4,507,984 A | 4/1985 | Goscenski, Jr. | |
| 4,513,633 A | 4/1985 | Goscenski, Jr. | |
| 4,559,846 A | 12/1985 | Cochran et al. | |
| 4,598,609 A | 7/1986 | Nellums et al. | |
| 4,715,467 A | 12/1987 | Sakai | |
| 4,873,879 A | 10/1989 | Butterfield et al. | |
| 5,195,604 A | 3/1993 | Brockett et al. | |
| 6,319,166 B1 | 11/2001 | Kyle et al. | |
| 6,470,771 B2 | 10/2002 | Nanri et al. | |
| 6,491,126 B1 | 12/2002 | Robinson et al. | |
| 6,530,447 B2 | 3/2003 | Seki et al. | |
| 6,659,256 B2 | 12/2003 | Seki et al. | |
| 6,679,348 B2 | 1/2004 | Handa | |
| 6,698,563 B2 | 3/2004 | Handa | |
| 6,758,297 B2 | 7/2004 | Handa | |
| 6,976,553 B1 | 12/2005 | Dahl et al. | |

(Continued)

OTHER PUBLICATIONS

International Search Report for PCT/US06/036166.

*Primary Examiner*—Lesley Morris
*Assistant Examiner*—Marc A Scharich
(74) *Attorney, Agent, or Firm*—IPLM Group, P.A.

(57) ABSTRACT

An all-terrain or utility vehicle having various combinations of left and right front wheels, left and right rear wheels, a differential rotationally variably coupling the left and right front wheels together with a variable coupling torque and a source of motive power being selectively coupled to the left and right rear wheels in one configuration and coupled to the left and right front wheels as well as to the left and right rear wheels in a second configuration. The coupling torque is relatively stronger when a speed of the vehicle is relatively slower and is relatively weaker when the speed of the vehicle is relatively faster. The second configuration is selectable from the first configuration while the vehicle is in motion and (1) a rotational difference in speed exists between at least one of the left and right front wheels and at least one of the left and right rear wheels and (2) a rotational speed of at least one of the left and right rear wheels exceeds a rotational speed of at least one of the left and right front wheels.

16 Claims, 4 Drawing Sheets

U.S. PATENT DOCUMENTS

| | | |
|---|---|---|
| 2002/0038736 A1 | 4/2002 | Handa |
| 2002/0046893 A1 | 4/2002 | Handa |
| 2002/0100629 A1 | 8/2002 | Handa |
| 2002/0104703 A1 | 8/2002 | Goto |
| 2003/0209378 A1 | 11/2003 | Handa |
| 2004/0003953 A1 | 1/2004 | Goto |
| 2004/0097321 A1 | 5/2004 | Handa |
| 2005/0121248 A1* | 6/2005 | Ushiroda et al. ............ 180/248 |

* cited by examiner

ALL TERRAIN OR UTILITY VEHICLE HAVING SELECTABLE DRIVE CONFIGURATIONS AND METHOD THEREFORE

RELATED APPLICATION

This disclosure is related to the following co-pending United States patent application entitled "DIFFERENTIAL" by John E. Hamrin, et al, filed on even date herewith, (Attorney Docket No. 124 P26 US01) which is not admitted as prior art with respect to the present disclosure by its mention in this section.

FIELD OF THE INVENTION

This invention relates to all-terrain or utility vehicles and, in particular, all-terrain or utility vehicles having selectable drive configurations and methods therefore.

BACKGROUND OF THE INVENTION

Control of drive configurations or characteristics of all-terrain or other types of utility vehicles can be unique to such vehicles. Such vehicles are often capable of being driven over uneven or hilly terrain. Such vehicles are often capable of encountering soft, loose or slippery soils as well as snow and/or ice.

A driver of such a vehicle typically operates the vehicles from a somewhat centrally located seat location using handle-bars to control the steering of the vehicle, typically accomplished by turning the front wheels with respect to the body of the vehicle.

Optimum drive characteristics for these vehicles often vary from rear wheel drive, front and rear wheel drive and all wheel drive. In a typical rear wheel drive configuration, only the rear wheels propel the vehicle. The rear wheels may be rotationally coupled allowing both rear wheels to provide traction. In front and rear wheel drive configuration (sometimes referred simply as four wheel drive), the rear wheels and at least one of the front wheels provide traction. In all wheel drive configuration, the rear wheels and both front wheels provide traction.

The drive configuration is fixed for some prior art systems. That is, the drive configuration can not be changed, e.g., from rear wheel drive to all wheel drive. In other prior art systems, the drive configuration can be selected by the operator but only in certain circumstances, e.g., such as when the vehicle is stationary.

Care should be taken in choosing a drive configuration and, in particular, in changing between drive configurations. Selecting or changing from one drive configuration to another drive configuration while the vehicle is in motion may affect the steering and/or handling of the vehicle and could result in loss of control of the vehicle.

One prior art system employed to engage front wheel drive (for a base rear wheel drive vehicle) is to employ engagement dogs, or splines. A limitation with this type of drive configuration is the inability to engage or disengage "on the fly," i.e., while the vehicle is in motion. Thus, it is typically not useful in a system that engages only when wheel slip is detected. An operator, or driver, of a vehicle using a system based upon this technique generally must anticipate driving conditions to be encountered and choose between greater traction capability or steering effort and handling. The same problem is true for engagement dogs used to control differentiation between the left and right front wheels. Additionally, this type of engagement is "all or nothing," i.e., the engagement typically can not be modulated like a clutch that is capable of slipping.

Over-running clutches have also been used on vehicles of this type. A disadvantage of an over-running clutch is that these systems generally have a front to rear gear ratio other than one, e.g., −0.83:1, depending on the particular vehicle. This front to rear ratio is generally used due to the need to prevent engagement of four wheel drive on surfaces having good traction during turns. This ratio difference can result in sudden engagement of front wheel drive under some circumstances, as well as ultimate traction, as the front and rear wheels fight each with different rotational rates when the front wheel drive is engaged. Further, the front wheels generally can not be use for engine braking, severely limiting the vehicle's capability in steep downhill terrain.

Another method utilized employs a differential mechanism that uses differential cams and a roller clutch to engage/disengage the front wheel drive. This type of system does not allow for computerized automatic engagement of front wheel drive and will usually not supply significant power to the tractive wheel if the other wheel is completely non-tractive. Further, tuning of this type of system is fundamental to the design and usually can not accept user or computer input.

Another traditional method of traction control uses silicon viscous technology to apply linear force to a clutch pack in response to differences in speed between the left and right front wheels. Usually, this method can not be tuned as a function of vehicle speed and may compromise high-speed handling with low-speed capability. Further, this method usually can not be disengaged, even in two-wheel (rear wheel) drive mode.

Traditional automotive methods, such as silicon viscous coupling between the transfer case and the front drive are generally not desirable because they usually do not exhibit safe braking characteristics on an all-terrain or utility vehicle. All-terrain or utility vehicles usually have the capability brake the rear wheels independent of the front wheels. During application of the rear brakes, if rear wheel lock-up occurs, a difference in front wheel speed to rear wheel speed would exist. A silicon viscous front wheel drive coupling system will attempt to limit that difference. Engagement could cause rotation of the front wheels to approach the rotation of the rear wheels, but only after a delay. This delay can unexpectedly try to pitch the driver over the handle-bars and is, thus, an unsafe condition.

Another traditional automotive technique is to employ a Torsen® style limited slip device to act between the left and right front wheels. However, this type of system generally can not be automatically or manually controlled and generally will not supply significant power to a tractive wheel if the other wheel is completely non-tractive, e.g., in the air or on ice.

Another traditional technique is to employ a "limited slip" mechanism between the left and right wheels. Since all-terrain vehicles generally don't have power steering to overcome the resulting increase in steering effort, steering effort can become unacceptably high. Further, the amount of engine torque that can be transmitted to only one wheel is severely limited, reducing off-road driving capability.

Still another prior art technique uses fly-weights that spin in accordance with the difference in left and right wheel rotational speed. At some preset speed, the fly weights cause the engagement of a locking mechanism. This type of system can have a dangerous handlebar jerk and poor handling upon engagement when used with a four wheel drive vehicle.

BRIEF SUMMARY OF THE INVENTION

There is needed an all-terrain or utility vehicle, or a control system for such vehicle, that provides low steering effort and predictable handling dynamics. The vehicle, or control system, should not provide unexpected and deleterious handlebar motion and/or should not provide unexpected and deleterious braking effects. Further, in some embodiments, the vehicle, or control system, should not provide a sudden loss of handling characteristics or control during changing riding conditions or varying terrain. In some embodiments, the vehicle, or control system, one wheel with poor traction should not prevent significant engine torque delivery to the other wheel on the same axis and/or other wheels on the vehicle.

In an embodiment, the present invention provides an all-terrain or utility vehicle having left and right front wheels, left and right rear wheels, a differential rotationally variably coupling the left and right front wheels together with a variable coupling torque and a source of motive power being selectively coupled to the left and right rear wheels in one configuration and coupled to the left and right front wheels as well as to the left and right rear wheels in a second configuration. The coupling torque is relatively stronger when a speed of the vehicle is relatively slower and is relatively weaker when the speed of the vehicle is relatively faster. The second configuration is selectable from the first configuration while the vehicle is in motion and (1) a rotational difference in speed exists between at least one of the left and right front wheels and at least one of the left and right rear wheels and (2) a rotational speed of at least one of the left and right rear wheels exceeds a rotational speed of at least one of the left and right front wheels.

In another embodiment, the present invention provides an all-terrain or utility vehicle having left and right front wheels, left and right rear wheels, a differential rotationally variably coupling the left and right front wheels together with a variable coupling torque and a source of motive power being selectively coupled to the left and right rear wheels in one configuration and coupled to the left and right front wheels as well as to the left and right rear wheels in a second configuration and a differential rotationally variably coupling the left and right front wheels together with a variable coupling torque. The variable coupling torque being relatively stronger when a speed of the vehicle is relatively slower and being relatively weaker when the speed of the vehicle is relatively faster.

In another embodiment, the present invention provides an all-terrain or utility vehicle having left and right front wheels, left and right rear wheels and a source of motive power being selectively coupled to the left and right rear wheels in one configuration and coupled to the left and right front wheels as well as to the left and right rear wheels in a second configuration. The second configuration being selectable from the first configuration while the vehicle is in motion and (1) a rotational difference in speed exists between at least one of the left and right front wheels and at least one of the left and right rear wheels and (2) a rotational speed of at least one of the left and right rear wheels exceeds a rotational speed of at least one of the left and right front wheels.

In another embodiment, the present invention provides an all-terrain or utility vehicle having left and right front wheels, left and right rear wheels and a source of motive power being selectively coupled to the left and right rear wheels in one configuration and coupled to the left and right front wheels as well as to the left and right rear wheels in a second configuration The left and right front wheels being optionally rotationally coupled together. The second configuration being selected whenever the left and right front wheels are rotationally coupled together.

In another embodiment, the present invention provides a method of controlling an all-terrain or utility vehicle having left and right front wheels, left and right rear wheels, a source of motive power being selectively coupled to the left and right rear wheels in one configuration and coupled to the left and right front wheels as well as to the left and right rear wheels in a second configuration and a differential rotationally variably coupling the left and right front wheels together with a variable coupling torque. The variable coupling torque is set relatively stronger when a speed of the vehicle is relatively slower and relatively weaker when the speed of the vehicle is relatively faster. The second configuration is selected from the first configuration while the vehicle is in motion and (1) a rotational difference in speed exists between at least one of the left and right front wheels and at least one of the left and right rear wheels and (2) a rotational speed of at least one of the left and right rear wheels exceeds a rotational speed of at least one of the left and right front wheels.

DETAILED DESCRIPTION OF THE INVENTION

Figure 1:
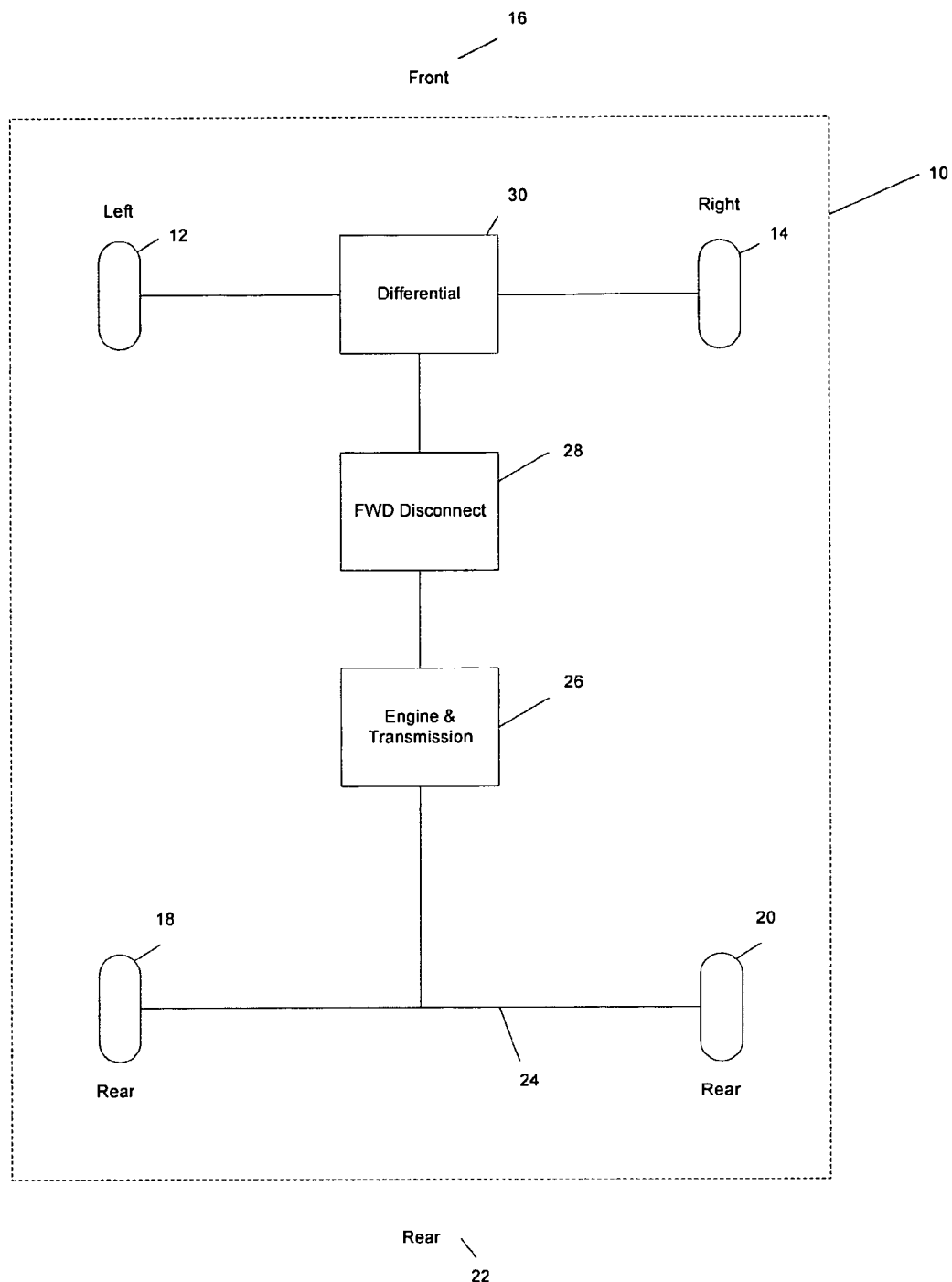
FIG. 1 is a diagrammatic block diagram of an all-terrain or utility vehicle.

In FIG. 1, an all-terrain or utility vehicle 10 is shown in diagrammatic form. Such all-terrain or utility vehicles are often capable of being driven over uneven or hilly terrain and are often capable of encountering soft, loose or slippery soils as well as snow and/or ice. While these vehicles are described as being all-terrain or utility vehicles, it is to be recognized and understood that other terms may be used to refer to such vehicles. Generally, a driver of such a vehicle typically operates the vehicles from a somewhat centrally located seat location using either handlebars or a steering wheel to control the steering of the vehicle, typically accomplished by turning the front wheels with respect to the body of the vehicle.

Vehicle 10 has a left front wheel 12 and a right front wheel 14 generally located toward the front 16 of vehicle 10. Together, left front wheel 12 and right front wheel 14 make up the left and right front wheels of vehicle 10. Vehicle 10 also has a left rear wheel 18 and a right rear wheel 20 generally located toward the rear 22 of vehicle 10. Together, left rear wheel 18 and right rear wheel 20 make up the left and right rear wheels of vehicle 10.

In a preferred embodiment, left rear wheel 18 and right rear wheel 20 are rotationally tied together by axle 24. Motive power to left and right rear wheels (18 and 20) is provided by engine and transmission 26 coupled conventionally to axle 24. Engine 26 may also be coupled to left and right front wheels (12 and 14) through front wheel drive disconnect 28 and differential 30.

Front wheel drive disconnect 28 allows vehicle 10 to have a plurality of handling configurations.

In one configuration, front wheel drive disconnect 28 is disengaged allowing engine 26 to provide motive power to left and right rear wheels (18 and 20) while not actively driving left and right front wheels (12 and 14). In such configuration, vehicle 10 is configured for rear wheel drive, i.e., vehicle 10 is tractively powered by both rear wheels (18 and 20) only. This configuration may be preferred for certain driving conditions such as driving on surfaces with good traction and/or at higher speeds. Rear wheel drive may provide vehicle 10 with adequate traction as well as relatively light steering control forces.

In another configuration, front wheel drive disconnect 28 may be engaged allowing engine 26 to provide motive power not only to left and right rear wheels (18 and 20) but also to left and right front wheels (12 and 14). Such configuration may be generally referred to as "front wheel drive," meaning that the left and right front wheels (12 and 14) are engaged for tractive power.

In an embodiment, front wheel drive disconnect 28 is an "all or nothing" connection. This means that front wheel drive disconnect 28 is either fully engaged, driving the front wheels with, generally, an equal amount of torque as drive the rear wheels. Many conventional front wheel drive disconnects 28 may be employed for this purpose.

Differential 30 is disposed between front wheel drive disconnect 28 and left and right front wheels (12 and 14) and between left front wheel 12 and right front wheel 14. Generally, differential 30 allows left front wheel 12 to turn somewhat independently, or differentially, from right front wheel 14. Such differential rotation may be desirable to aid handling characteristics when, for example, vehicle 10 is turning and one of the front wheels must traverse a longer arc than the other front wheel. Such differential in rotation may prevent one, or both, of the front wheels from scuffing or skidding on the terrain surface during a vehicle turn.

In an embodiment, differential 30 may also be used to apply a variable amount of rotational torque between left front wheel 12 and right front wheel 14. If no rotational torque exists between left front wheel 12 and right front wheel 14, then one of the wheels would not obtain any, or little, tractive force if the other wheel was slipping or spinning, such as may exist if one of the wheels was in the air or on ice. Such an event could result in vehicle 10 having three-wheel drive (the two rear wheels and only one of the front wheels). Further, since the one front wheel may not have traction, the net result may be loss of front wheel drive capability, i.e., essentially rear wheel drive.

If differential 30 applies a great amount of rotational coupling torque between left front wheel 12 and right front wheel 14, then both front wheels will be essentially rotationally locked together and all wheel drive traction (with front wheel drive engaged) will be available to the operator of vehicle 10.

A preferred example of a differential that can be used for differential 30 is described in co-pending United States patent application entitled "DIFFERENTIAL" by John E. Hamrin, et al, filed on even date herewith, Ser. No. 11/251,094, which is hereby incorporated herein by reference in its entirety.

However, since vehicle 10 may be operated in a variety of conditions and the various driving/handling characteristics of vehicle are desired to be available to the operator, vehicle 10 may switch between drive configurations while vehicle 10 is on motion. When vehicle 10 is in motion, switching between low left-right torque and/or between rear wheel drive and front wheel drive, care should be taken to ensure continued vehicle stability and controllability.

Left-right torque may be engaged when, or following, a slippage of one left and right front wheels (12 and 14) resulting in a significant differential in rotation between left front wheel 12 and right front wheel 14. If left-right torque is suddenly engaged at higher vehicles, the handlebars or steering wheel of vehicle 10 may undergo significant torque resulting in an adverse experience for the operator and, possibly, a deleterious effect on the handling of vehicle 10. In an embodiment, the left-right torque engagement of vehicle 10 may be relatively low when engaged during relatively higher vehicle speeds and may be relatively high when engaged during relatively lower vehicle speeds. More left-right torque is generally needed at lower speeds to enable vehicle 10 to escape low speed/low traction events.

Once engaged, left-right torque may be gradually reduced in time if no further or lessened rotation differential exists between left front wheel 12 and right front wheel 14. Thus, disengagement of left-right torque in differential 30 is not an abrupt on-off but rather a gradual reduction.

In an embodiment, engagement front wheel drive disconnect 28 should only occur when the rear wheels (18 and 20) is rotating faster than at least one of the front wheels (12 and 14). If the opposite were true, the possibility would exist for the operator to be thrown over the handlebars or steering wheel upon a sudden deceleration of vehicle 10 upon sudden engagement of front wheel drive disconnect 28.

In an embodiment, front wheel drive disconnect 28 is engaged whenever differential 30 applies left-right torque between left front wheel 12 and right front wheel 14.

Figure 2A:
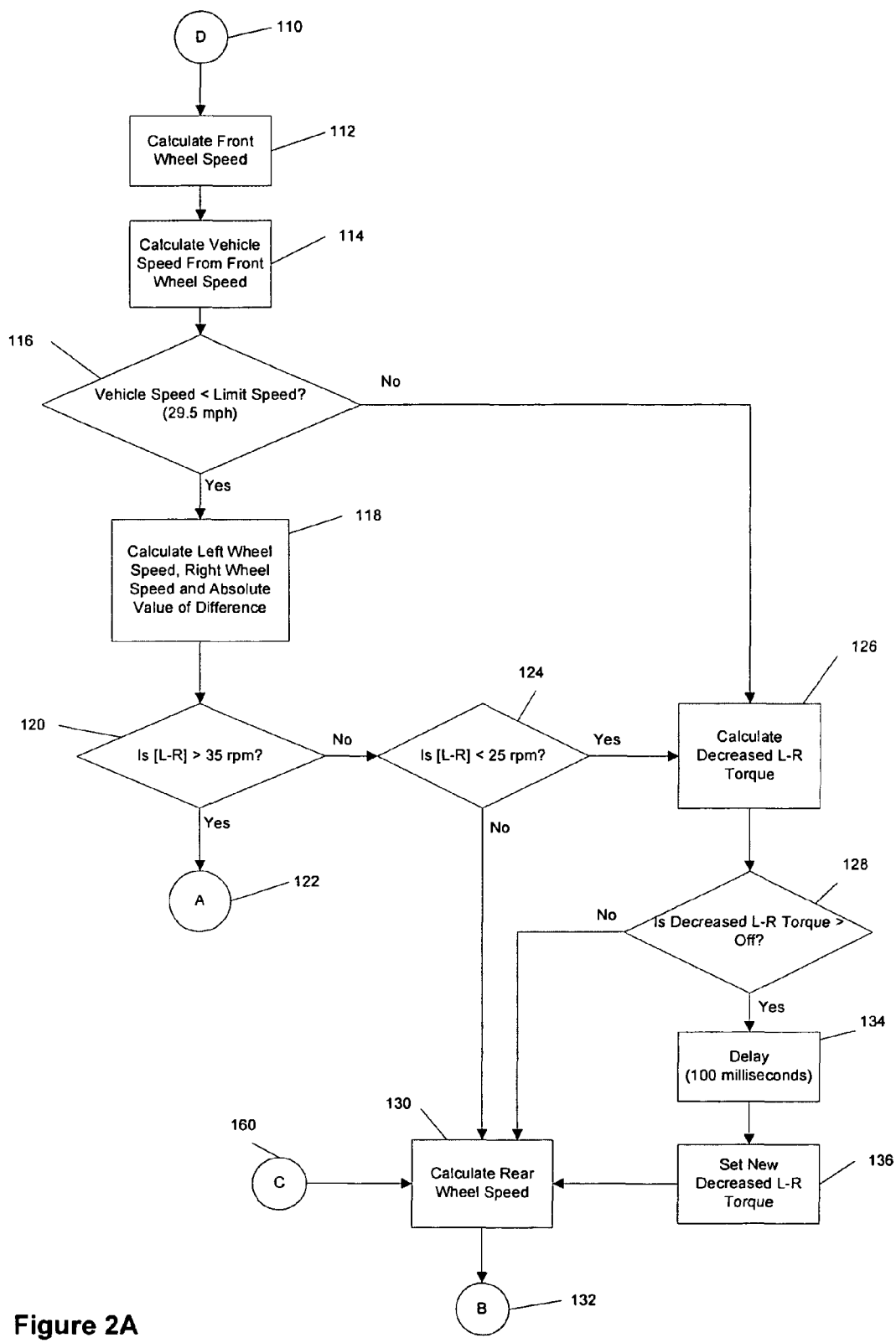
FIG. 2A is a flow diagram of a portion of a vehicle control system mainly illustrating left/right wheel slip engagement criteria.
Figure 2B:
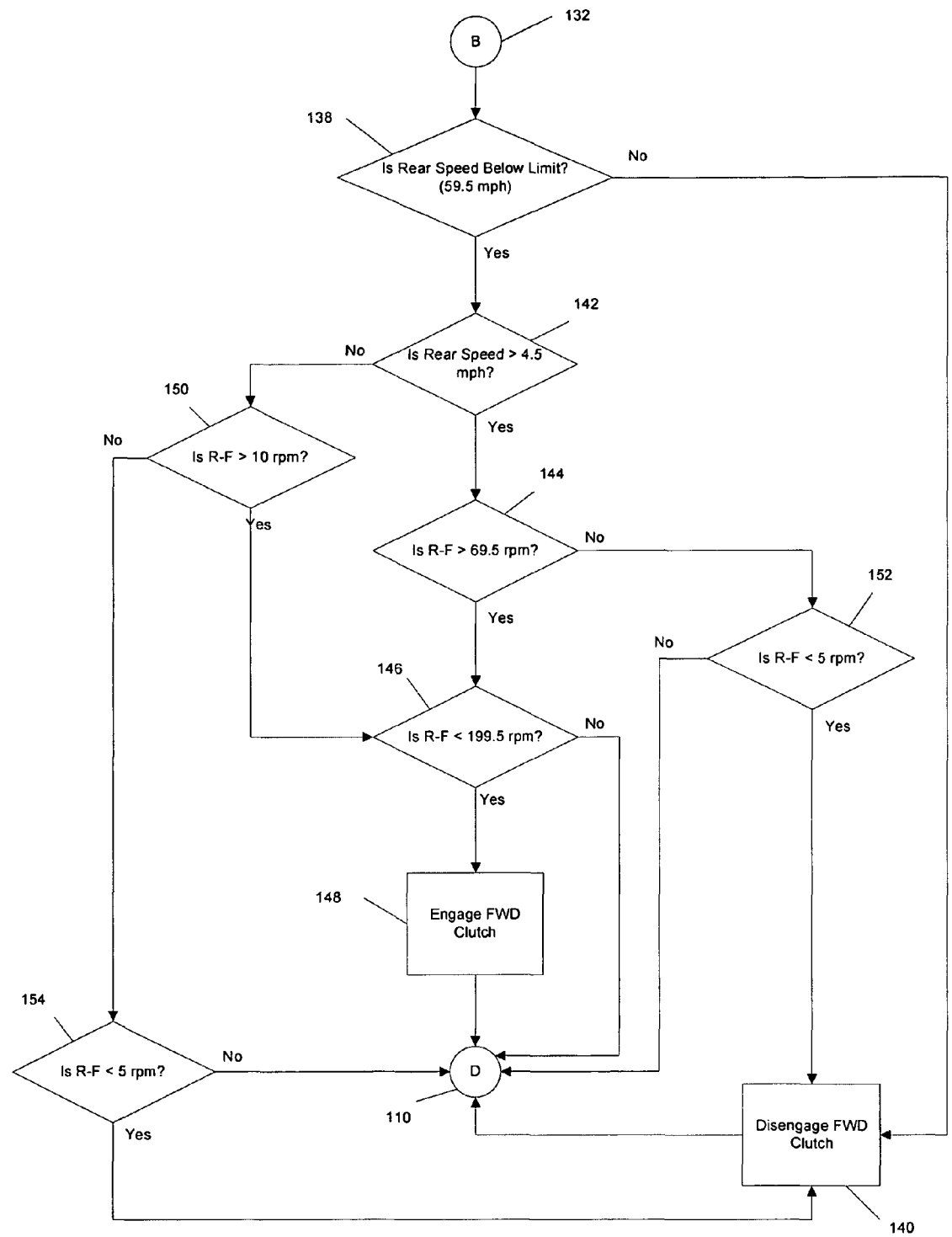
FIG. 2B is a flow diagram of another portion of a vehicle control system mainly illustrating front/rear engagement parameters.
Figure 2C:
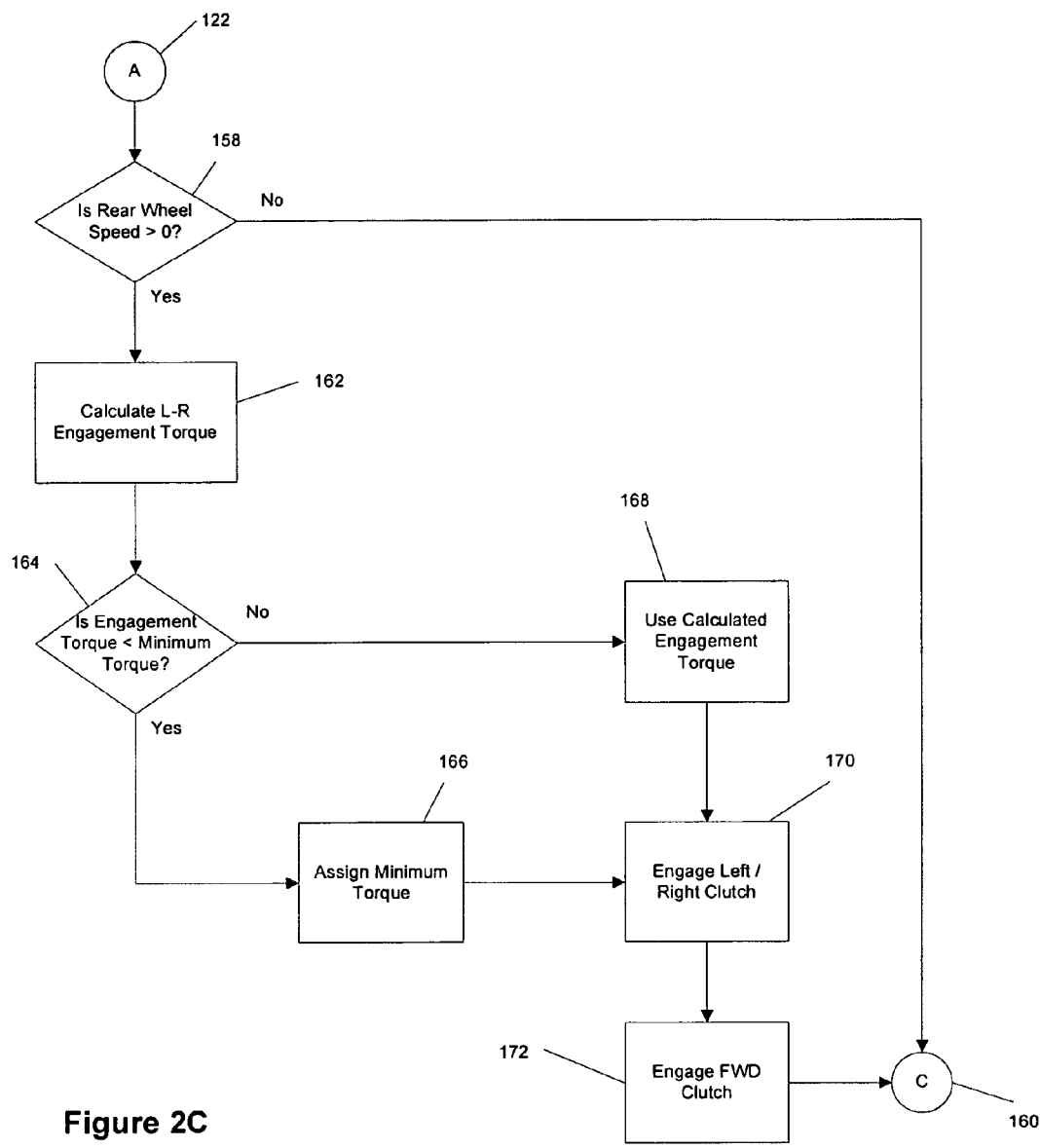
FIG. 2C is a flow diagram of another portion of a vehicle control system mainly illustrating left/right wheel torque parameters.

FIG. 2A, FIG. 2B and FIG. 2C is a flow chart illustrating the drive configuration control system of vehicle 10.

In FIG. 2A, the control system begins (110) by calculating the rotational speed of each of front wheels (12 and 14) (112). From the rotational speed of front wheels (12 and 14), the speed of vehicle 10 may be calculated (114) conventionally. If the vehicle speed is less than a limit speed (116), in this example 29.5 miles per hour, the absolute difference in the rotational speed of left front wheel 12 and the rotational speed of right front wheel 14 is calculated (118). If the absolute value of the rotational difference of left and right front wheels (12 and 14) is greater than 35 revolutions per minute (120), the control system moves to flow chart connecting point A (122) to engage the left-right torque clutch in differential 30.

If the absolute value of the rotational difference of left and right front wheels (12 and 14) is greater than 35 revolutions per minute (120), it is determined if the absolute value of the rotational difference of left and right front wheels (12 and 14) is less than 25 revolutions per minute (124). If so or if the vehicle speed limit is not less than 29.5 miles per hour (116), a decreased left-right torque value is calculated (126). Then if the decreased left-right torque value is not greater than a lower limit (128), e.g., an "off" value, or if the absolute value of the rotational difference of left and right front wheels (12 and 14) is not less than 25 revolutions per minute (124), the rear wheel speed is calculated (130) and the control system moves to transfer node B (132) to determine whether the front wheel drive disconnect 28 should be engaged.

If however, the decreased left-right torque value is greater than the lower limit (128), the control system delays (134) for a predetermined period of time, e.g., 100 milliseconds and applies (136) the decreased left-right torque value in differential 30. The control system then calculates the rear wheel speed (130) and moves to transfer node B (132) to determine whether the front wheel drive disconnect 28 should be engaged.

In FIG. 2B, from transfer node B (132), the control system determines if the rear speed limit is below a predetermined limit (138), e.g., 59.5 miles per hour. If not, the front wheel drive disconnect 28 is disengaged (140) (if the front wheel drive 28 was previously engaged). If so, it is determined (142) whether or not the rotational of the rear wheels results in a vehicle speed of greater than 4.5 miles per hour. If so, it is determined (144) whether or not the rotational difference in speed between the rear wheels (18 and 20) and the front wheels (12 and 14) is greater than 69.5 revolutions per minute. If so, it is determined (146), whether the rotational difference in speed between the rear wheels (18 and 20) and the front wheels (12 and 14) is less than 199.5 revolutions per minute. If so, the front wheel drive disconnect 28 is engaged (148).

Front wheel drive disconnect 28 is also engaged (148) if the speed of the vehicle 10 as calculated from the rotation of the rear wheels (18 and 20) is not greater than 4.5 miles per hour (142), the rotational difference in speed between the rear wheels (18 and 20) and the front wheels (12 and 14) is greater than ten (10) revolutions per minute (150) and the rotational difference in speed between the rear wheels (18 and 20) and the front wheels (12 and 14) is less than 199.5 revolutions per minute (146).

If however, the speed of the vehicle 10 as calculated from the rotation of the rear wheels (18 and 20) is greater than 4.5 miles per hour (142), the rotational difference in speed between the rear wheels (18 and 20) and the front wheels (12 and 14) is greater than 69.5 revolutions per minute and the rotational difference in speed between the rear wheels (18 and 20) and the front wheels (12 and 14) is not less than 5 revolutions per minute (152), then front wheel drive disconnect 28 is engaged (148).

If however, the speed of the vehicle 10 as calculated from the rotation of the rear wheels (18 and 20) is greater than 4.5 miles per hour (142), the rotational difference in speed between the rear wheels (18 and 20) and the front wheels (12 and 14) is greater than 69.5 revolutions per minute and the rotational difference in speed between the rear wheels (18 and 20) and the front wheels (12 and 14) is less than 5 revolutions per minute (152), then front wheel drive disconnect 28 is disengaged (140).

Front wheel drive disconnect 28 is also disengaged (140) if the speed of the vehicle 10 as calculated from the rotation of the rear wheels (18 and 20) is not greater than 4.5 miles per hour (142), the rotational difference in speed between the rear wheels (18 and 20) and the front wheels (12 and 14) is not greater than ten (10) revolutions per minute and the rotational difference in speed between the rear wheels (18 and 20) and the front wheels (12 and 14) is less than 5 revolutions per minute (154).

However, front wheel drive disconnect 28 is not modified if the speed of the vehicle 10 as calculated from the rotation of the rear wheels (18 and 20) is not greater than 4.5 miles per hour (142), the rotational difference in speed between the rear wheels (18 and 20) and the front wheels (12 and 14) is not greater than 5 revolutions per minute and the rotational difference in speed between the rear wheels (18 and 20) and the front wheels (12 and 14) is not less than ten (10) revolutions per minute (154), or if front wheel drive disconnect is either engaged (148) or disengaged (140), control system moves to transfer node D (110) and returned to start.

In FIG. 2C, from transfer node A (122), control system moves the portion of the flow chart which primarily determines the left-right engagement torque for differential 30.

If the rear wheel speed is not greater than zero (158), the left-right clutch is not engaged and the control moves to transfer node C (160) and returns to calculate rear wheel speed (130) in FIG. 2A.

If the rear wheel speed is greater than zero (158), the left-right engagement torque is calculated (162). The value of the left-right engagement torque to be applied by differential 30 is determined by using a calculation based as a function of the speed of vehicle 10 as determined by the rotation of the front wheels (12 and/or 14). In an embodiment, the left-right engagement torque decreases as the speed of vehicle 10 increases. In an embodiment, the formula Engagement Torque=Maximum Torque−(Front Vehicle Speed*Constant)

where the Maximum Torque is the left-right engagement torque for a vehicle at rest and Constant is a predetermined value used to linearly decrease the engagement force as the vehicle speed increases. It is to be recognized and understood that the exemplary formula is only one of many formulas which may be used to decrease the left-right engagement torque and may be non-linear as well as linear.

Following calculation of left-right engagement torque (162), it is determined (164) whether the calculated left-right engagement torque is less than a predetermined minimum torque. If so, a minimum torque value is assigned (166) and if not, the calculated torque is used (168). In either event, the left-right clutch of differential 30 is engaged (170) using either the assigned minimum or calculated torque value.

In an embodiment, front wheel drive disconnect 28 is engaged (172) whenever the left-right clutch of differential 30 is engaged. Following engagement of front wheel drive disconnect 28, the control system moves to transfer node C (160) and returns to calculate rear wheel speed (130) in FIG. 2A.

From the above-described flow chart of the control system for vehicle 10, the front wheel drive disconnect is engaged (1) at vehicle speeds not greater than 4.5 miles per hour and a rotational difference in speed between the rear wheels (18 and 20) and the front wheels (12 and 14) of between 10 and 199.5 revolutions per minute, or (2) at vehicle speeds greater than 4.5 miles per hour and a rotational difference in speed between the rear wheels (18 and 20) and the front wheels (12 and 14) of between 69.5 and 199.5 revolutions per minute.

The front wheel drive disconnect 28 is disengaged if (1) vehicle 10 is over the speed limit, e.g., 59.5 miles per hour, or (2) the rotational difference in speed between the rear wheels (18 and 20) and the front wheels (12 and 14) is less than 5 revolutions per minute.

The front wheel drive disconnect state of engagement is neither changed from its prior state to engaged nor disengaged (1) at vehicle speeds not greater than 4.5 miles per hour and a rotational difference in speed between the rear wheels (18 and 20) and the front wheels (12 and 14) of either between 5 and 10 revolutions per minute or greater than 199.5 revolutions per minute, or (2) at vehicle speeds greater than 4.5 miles per hour and a rotational difference in speed between the rear wheels (18 and 20) and the front wheels (12 and 14) of either between 10 and 69.5 revolutions per minute or over 199.5 revolutions per minute.

Thus, embodiments of the all-terrain or utility vehicle having selectable drive characteristics and method therefore are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. An all-terrain or utility vehicle, comprising:
left and right front wheels;

left and right rear wheels;
a differential rotationally variably coupling said left and right front wheels together with a variable coupling torque; and
said coupling torque being relatively stronger when a speed of said vehicle is relatively slower and being relatively weaker when said speed of said vehicle is relatively faster;
a source of motive power being selectively coupled to said left and right rear wheels in a first configuration and coupled to said left and right front wheels as well as to said left and right rear wheels in a second configuration; and
said second configuration being selectable from said first configuration while said vehicle is in motion only when (1) a rotational difference in speed exists between at least one of said left and right front wheels and at least one of said left and right rear wheels and (2) a rotational speed of at least one of said left and right rear wheels exceeds a rotational speed of at least one of said left and right front wheels.

2. The all-terrain or utility vehicle as in claim 1 wherein said variable coupling torque is gradually decreased over time.

3. The all-terrain or utility vehicle as in claim 2 wherein said variable coupling torque is reduced in a plurality of discrete steps.

4. The all-terrain or utility vehicle as in claim 1 wherein said second configuration is selected whenever said left and right front wheels are rotationally coupled together.

5. The all-terrain or utility vehicle as in claim 1 wherein said rotational difference in speed is predetermined.

6. The all-terrain or utility vehicle as in claim 5 wherein said rotational difference in speed varies as a speed of said vehicle varies.

7. The all-terrain or utility vehicle as in claim 6 wherein said rotational difference in speed is relatively lower at relatively lower vehicle speeds and relatively higher at relatively higher vehicle speeds.

8. An all-terrain or utility vehicle, comprising:
left and right front wheels;
left and right rear wheels;
a source of motive power being selectively coupled to said left and right rear wheels in one configuration and to said left and right front wheels as well as to said left and right rear wheels in a second configuration; and
a differential rotationally variably coupling said left and right front wheels together with a variable coupling torque;
said variable coupling torque being relatively stronger when a speed of said vehicle is relatively slower and being relatively weaker when said speed of said vehicle is relatively faster.

9. The all-terrain or utility vehicle as in claim 8 wherein said variable coupling torque is gradually decreased over time.

10. The all-terrain or utility vehicle as in claim 9 wherein said variable coupling torque is reduced in a plurality of discrete steps.

11. An all-terrain or utility vehicle, comprising:
left and right front wheels;
left and right rear wheels; and
a source of motive power being selectively coupled to said left and right rear wheels in a first configuration and coupled to said left and right front wheels as well as to said left and right rear wheels in a second configuration;
said second configuration being selectable from said first configuration while said vehicle is in motion only when (1) a rotational difference in speed exists between at least one of said left and right front wheels and at least one of said left and right rear wheels and (2) a rotational speed of at least one of said left and right rear wheels exceeds a rotational speed of at least one of said left and right front wheels.

12. The all-terrain or utility vehicle as in claim 11 wherein said second configuration is selectable from said first configuration while said vehicle is in motion and (1) a rotational difference in speed exists between at least one of said left and right front wheels and at least one of said left and right rear wheels and (2) a rotational speed of at least one of said left and right rear wheels exceeds a rotational speed of an average rotational speed of said left and right front wheels.

13. The all-terrain or utility vehicle as in claim 11 wherein said rotational difference in speed is predetermined.

14. The all-terrain or utility vehicle as in claim 13 wherein said rotational difference in speed varies as a speed of said vehicle varies.

15. The all-terrain or utility vehicle as in claim 14 wherein said rotational difference in speed is relatively lower at relatively lower vehicle speeds and relatively higher at relatively higher vehicle speeds.

16. An all-terrain or utility vehicle, comprising:
left and right front wheels;
left and right rear wheels; and
a source of motive power being able to be selectively coupled to said left and right rear wheels in one configuration and to said left and right front wheels as well as to said left and right rear wheels in a second configuration;
wherein said left and right front wheels are optionally rotationally coupled together; and
said second configuration being selected whenever said left and right front wheels are rotationally coupled together.

* * * * *